United States Patent [19]

Ha

[11] Patent Number: 5,907,894

[45] Date of Patent: Jun. 1, 1999

[54] SPRING COMPRESSION DEVICE FOR SHOCK ABSORBER OF MOTOR CAR

[76] Inventor: Tae-Hong Ha, 547-4, Jangan3-dong, Dongdaemoon-ku, Seoul, Rep. of Korea

[21] Appl. No.: 08/842,878

[22] Filed: Apr. 17, 1997

[51] Int. Cl.[6] .................................................. B23P 19/04
[52] U.S. Cl. .............................................................. 29/227
[58] Field of Search .................... 29/225, 227, 215–218; 254/10.5

[56] References Cited

U.S. PATENT DOCUMENTS 5,172,462  12/1992  Ha ............................................ 29/227

FOREIGN PATENT DOCUMENTS 83-7256  3/1985  Rep. of Korea .

*Primary Examiner*—Robert C. Watson
*Attorney, Agent, or Firm*—Skjerven, Morrill, MacPherson, Franklin & Friel LLP; Alan H. MacPherson

[57] ABSTRACT

A spring compression device for a shock absorber of a motor car includes a hollow vertical post, a rack mounted inside the post engaged with a pinion and being movable upward or downward by a compression handle. A spring holder includes a spring hanger for hanging an absorber spring. One end of the holder is connected by a hinge to a head on the rack top so as to be rotated left and right. A pair of pivoting arms each include a boss, the arms being rotatively mounted on both sides of a second hinge so as to be widened left and right. A shock absorber holder is mountable at an outer end portion of the arms. A feed screw shaft moves the pivoting arms left and right, centering around the second hinge. A tightening handle is attached to one end of the feed screw shaft to perform loosening and tightening operations of the pivoting arms. A shock absorber holder includes an outer holding portion detachably engaged with the boss on each pivoting arm, one end of the absorber holder holding a shock absorber of a large diameter, and another end alternatively holding a shock absorber of a small diameter.

8 Claims, 9 Drawing Sheets

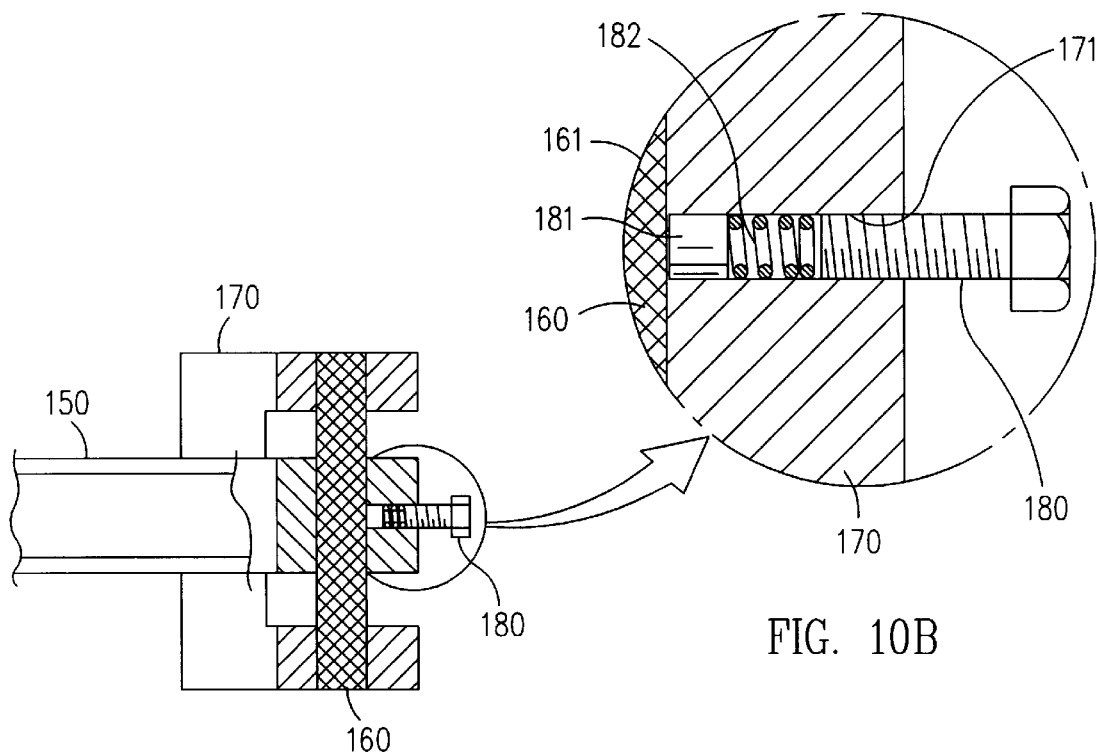

SPRING COMPRESSION DEVICE FOR SHOCK ABSORBER OF MOTOR CAR

BACKGROUND OF THE INVENTION

1. Field of the Invention

The present invention relates to a spring compression device for a shock absorber employed in mounting a spring in a shock absorber being mounted in a suspension system of a motor car. More particularly, it relates to a spring compression device for a shock absorber in which by varying the size and shape of a pivoting arm in correlation with the specification of a shock absorber, varying according to the kind of a vehicle, a wider range of spring set-up for the shock absorber can be performed.

The suspension system of a motor car is equipped with a shock absorbing apparatus of the motor car, and its main parts comprise upper and lower arms holding wheels and a shock absorber connecting the wheels with the upper and lower arms such that vibration or shock conveyed from the road surface during traveling can be absorbed by the shock absorber.

In the shock absorber, a spring for absorbing vibration or shock by means of elastic force is mounted, and normally, operations for exchanging and maintaining or repairing the shock absorber are conducted by more than two laborers who are compressing a highly resilient coil spring.

However, the spring compression operation is conducted in a very difficult way and requires a long time, and in a narrow place, more than two persons must conduct the operation thereby causing lots of inconvenience to the operation of maintenance or repair due to the restriction of an area.

2. Description of the Related Art

Accordingly, the prior art for solving such problems was disclosed in the Korean Utility Model Application Nos. 95-45543 (Title of a device: Spring Compression Device for a Shock Absorber of a Motor Car) and 83-7256 (Title of a device: Shock Absorber for a Motor Car) filed by the present applicant.

Before the present invention is described, the latest technology of the prior art, the Korean Utility Model Application No. 95-45543 is explained with reference to the accompanying drawings hereinafter.

FIG. 1 illustrates, as an example of such prior art in the field which the present invention pertains to, a spring compression device for a shock absorber comprising a hollow post 10 being vertically formed, a rack 19 being mounted inside the hollow post 10, being engaged with a pinion and being moved upward or downward, a compression handle 13 moving the rack upward or downward, a spring holder 15 having a spring hanger 15a for hanging a spring being connected by a hinge 15b to a head 17 formed at the top of the rack 19 so as to be rotated left and right, a pivoting arm 30 for pivoting a shock absorber being formed with an integral structure at the lower part of the hollow post 10, and a pivoting arm tightening handle 31 being screwed at one side of the pivoting arm 30 and tightening the pivoting arm 30 with a certain pressure.

In such conventional spring compression device for a shock absorber having the above described construction, operations for holding the shock absorber and mounting the spring are conducted. In such operations, a pivoting arm tightening element 32 and the pivoting arm tightening handle 31 are mounted so that the pivoting arm 30 is tightened and is tightly adhered to the shock absorber, by rotating the pivoting arm tightening handle 31.

After that, the shock absorber is pivoted to the pivoting arm 30, and then the spring holder 15 formed at the top of the hollow post 10 is adequately opened and the spring hanger 15a formed at the top of the spring holder 15 is mounted for hanging a spring of the shock absorber.

As such, after mounting a spring of the shock absorber in the spring holder 15, and rotating the compression handle 23 of the hollow post 10, the rack 19 being engaged with a pinion gear (not shown) goes down and at the same time, the head 17 mounted at the top of the rack 19 and the spring holder 15 go down, thereby compressing the spring of the shock absorber.

In the conventional spring compression device for the shock absorber as described above, when the shock absorber of a small diameter is mounted, pivoting status achieved by the pivoting arm 30 could be securely maintained. However, when the spring of the shock absorber applicable to a large vehicle is mounted, it had a structural drawback since pivoting by the pivoting arm 30 was not easy.

Namely, the conventional spring compression device has a structure including a reinforcing rib is mounted for supplementing structural strength between an upper flange of a large shock absorber and the outer surface. Accordingly, if this structure is mounted in the spring compression device of the shock absorber, the reinforcing rib formed at the periphery of the shock absorber is caught in the pivoting arm, and as the result, such structural problems cause difficult mounting operations.

SUMMARY OF THE INVENTION

The present invention was conceived to solve the conventional problems described above. An object of the present invention is to provide a spring compression device for a shock absorber in which by varying the size and shape of a pivoting arm in correlation with the specification of a shock absorber varying according to the kind of a vehicle, a wider range of spring set-up for the shock absorber can be performed.

To achieve such object, the present invention is characterized in that the spring compression device according to the present invention comprises a hollow post being vertically formed, a rack being mounted inside the hollow post, being engaged with a pinion and being moved upward or downward, a compression handle moving the rack upward or downward, a spring holder having a spring hanger for hanging a spring of the shock absorber, one end of which is connected by a hinge to a head formed at the top of the rack so as to reciprocate left and right, a hinge means formed in an integral structure at the lower part of a hollow post, the pivoting arm having a boss rotatively mounted on both sides of the hinge means so as to be widened left and right and at the end portion holding means being pivoted, a feed screw shaft moving the pivoting arm left and right centering around the hinge, a pivoting arm tightening handle formed at one side of the feed screw shaft and performing loosening and tightening operations, with the holding means having an outer holding means detachably engaged with a boss formed at the end portion of the pivoting arm, one end of which holds a shock absorber of a large diameter, and an inner holding means holding a shock absorber of a small diameter.

BRIEF DESCRIPTION OF THE DRAWINGS

FIG. 1 is a perspective view illustrating an example of the prior art in the field which the present invention pertains to.

FIG. 10A is a section view illustrating a stopper for establishing the widening degree of a spring holder according to the present invention.

FIG. 10B is a magnified section view of the circled area of FIG. 10A.

DETAILED DESCRIPTION OF THE PREFERRED EMBODIMENT

Hereinafter, desirable examples of the present invention will be described with reference to the accompanying drawings.

Figure 1:
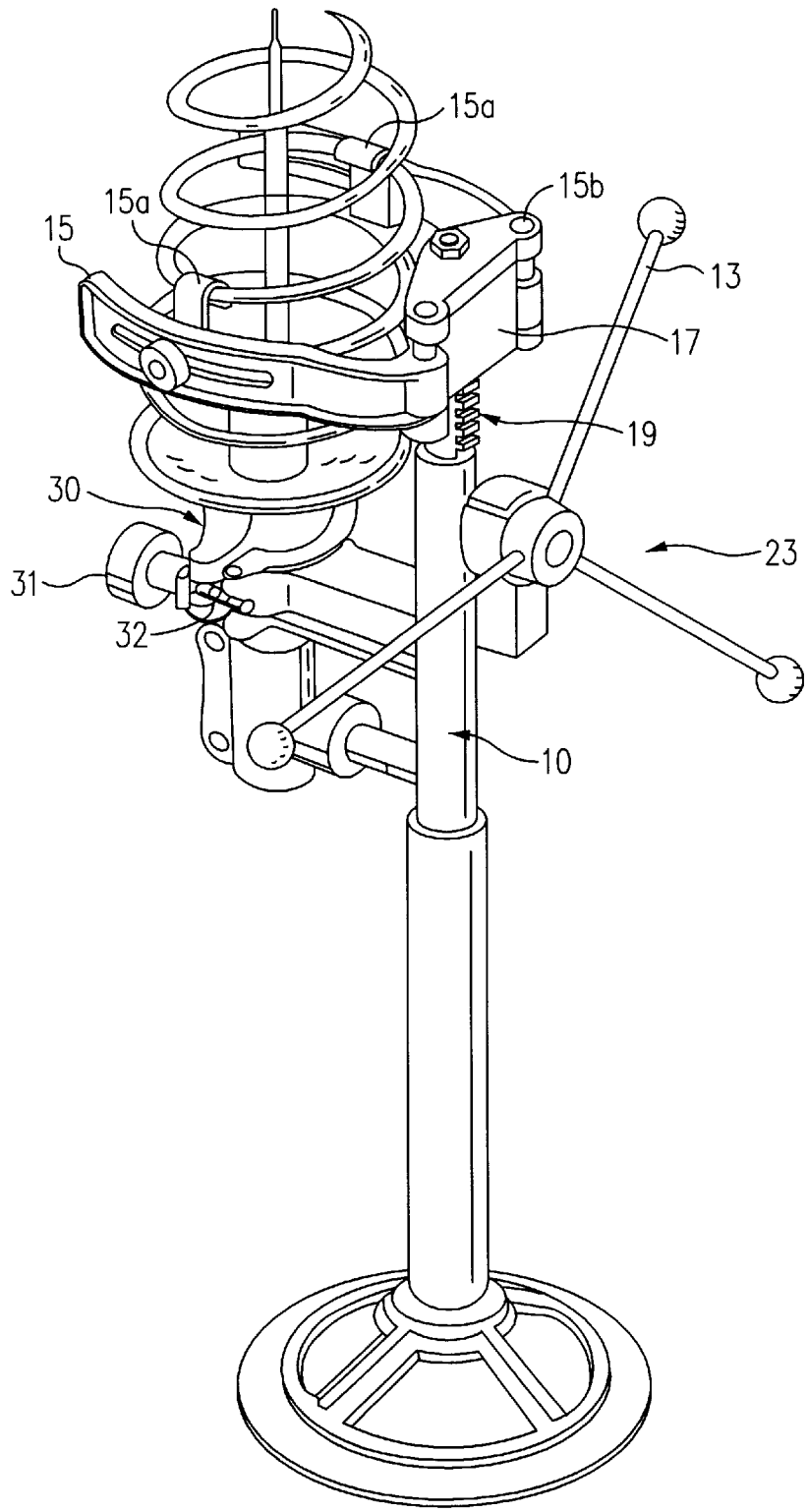
Figure 2:
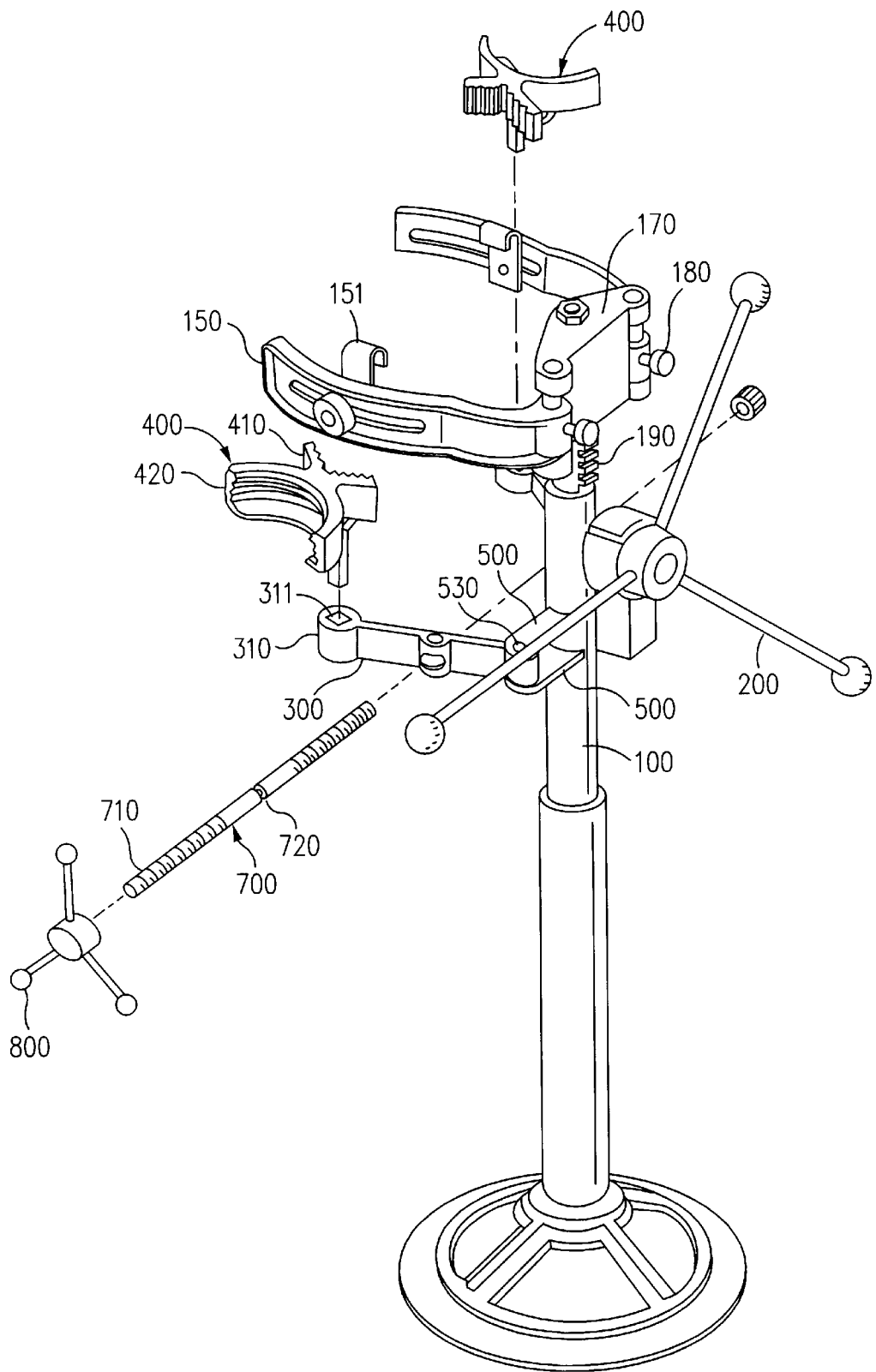
FIG. 2 is a separated general perspective view illustrating a spring compression device for a shock absorber according to the present invention.

FIG. 2 is a general perspective view illustrating a spring compression device for a shock absorber according to the present invention and shows the general construction of the present invention.

That is, at the upper end of the supporting rod a hollow post 100 is vertically formed in a cylindrical shape. Inside the hollow post 100 a rack 190 is mounted and is engaged with a pinion (not shown) mounted in one side of the hollow post 100, and thus the rack 190 is moved. A compression handle 200 is connected with the pinion and thus the pinion is rotated. By the rotation of the pinion the rack 190 is moved upward or downward. At the upper end of the rack 190 a head 170 is formed and on both sides of the head 170 a spring holder 150 is formed to be rotatively moved left and right. Also, in such spring holder a spring hanger 151 is mounted for holding a steel wire of the spring.

Figure 4:
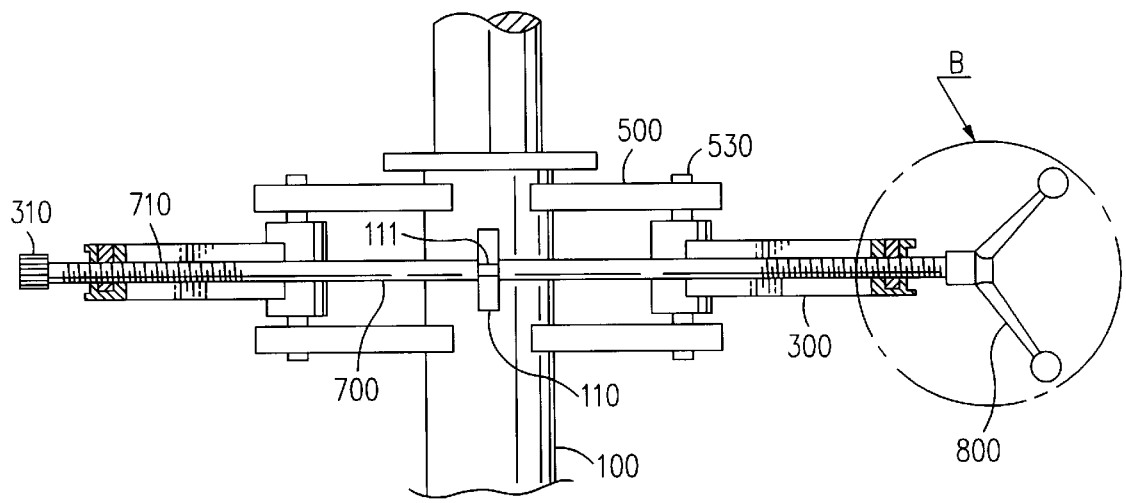
FIG. 4 is a front view illustrating the gist of the present invention.
Figure 5:
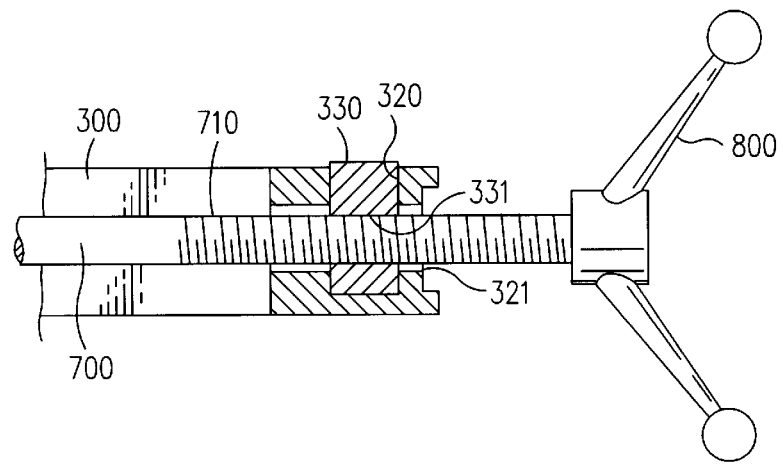
FIG. 5 is an enlarged section view illustrating the circled "B" section of FIG. 4.

In the above, the structure for holding a spring for a shock absorber was described. A structure for holding the shock absorber itself will be described with reference to the embodiment as shown in FIG. 4 hereinafter. Hinge means 500 are formed on the hollow post below the lower portion of the spring holder 150. Such hinge means are divided by an upper hinge means 510 and a lower hinge means 520 to be formed respectively. On both sides of the hinge means 500 a pivoting arm 300 is connected rotatively with a hinge 530 so as to be widened left and right. Such pivoting arms 300 are transversely connected with a feed screw shaft 700 and the feed screw shaft 700 is screwed with respect to the pivoting arm 300 such a that the screw shaft passes through the pivoting arms.

Figure 3:
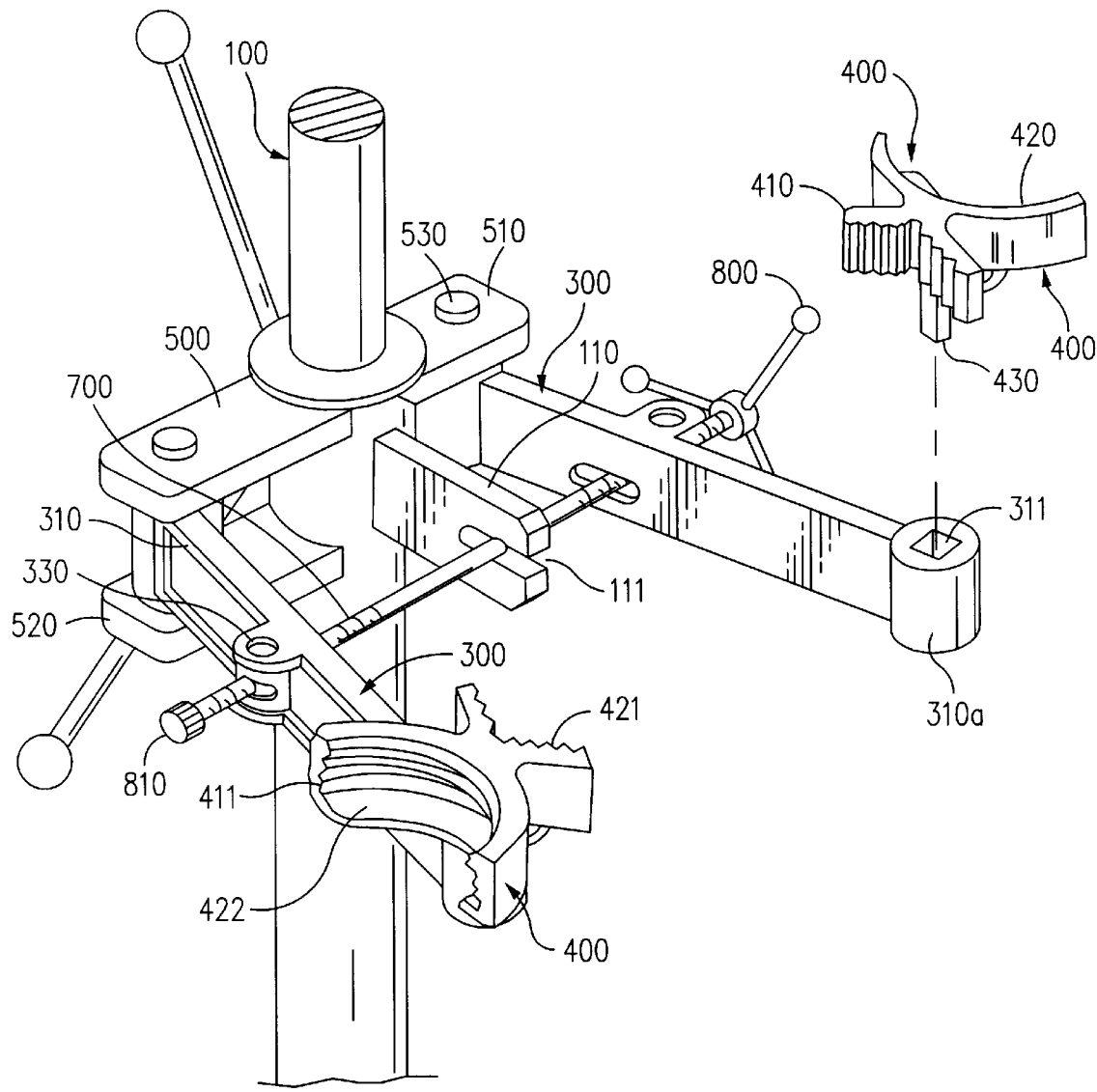
FIG. 3 is a perspective exploded view illustrating the gist of the present invention.

As shown in FIG. 2, a groove 720 is formed on the center of the feed screw shaft 700 with an engraved round shape, and the groove 720 is inserted into a cut-out opening 111 (FIG. 3) of a guiding means or guide projection 110 projectingly formed on one side of the hollow post 100 so that the feed screw shaft 700 can be moved in a front and rear direction. On one end of the feed screw shaft 700 a pivoting arm tightening handle 800 is integrally formed, and with the rotation of the pivoting arm tightening handle 800 the pivoting arms 300 perform the tightening and loosening operations in a left and right direction.

Figure 6:
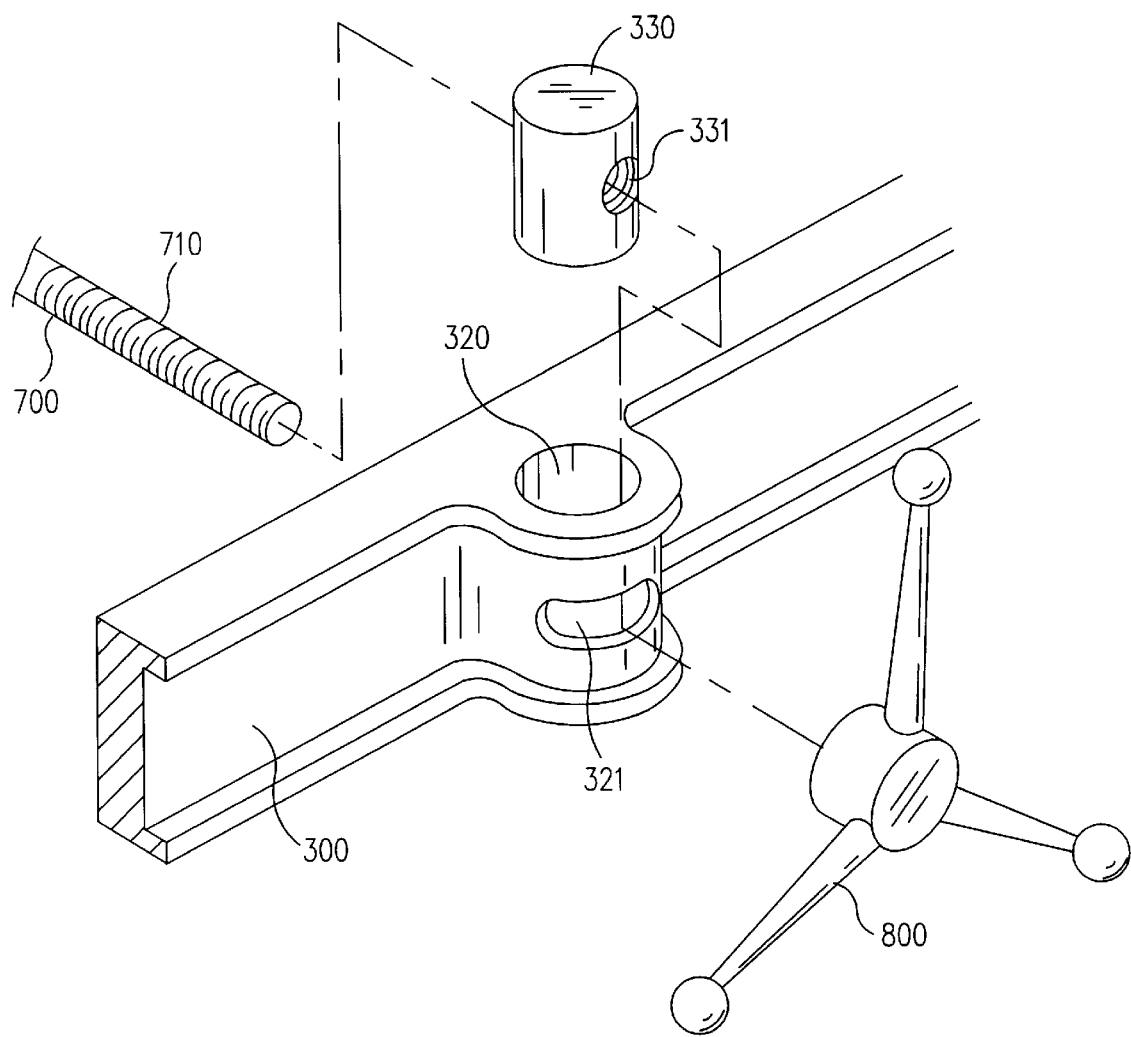
FIG. 6 is a separated perspective view illustrating the connection of a pivoting arm with a feed screw shaft according to the present invention.

FIG. 6 shows in more detail the connection of the pivoting arm 300 with the feed screw shaft 700 being connected with the pivoting arm tightening handle 800. In a transverse direction of both sides of the pivoting arm 300 the feed screw shaft 700 is passed through and one end of the feed screw shaft 700 which was passed through is integrally formed on the pivoting arm tightening handle 800, and the other end portion of shaft 700 is wrapped in a cap 810. The portion which the feed screw shaft 700 is passed through comprises a circular fitting hole 320 in one surface of the pivoting arm 300, into a short which cylindrical nut 330 is inserted. A helical part 710 of the feed screw shaft 700 is screwed into a helical hole 331 of the nut 330 so as to be structurally connected with the pivoting arm 300. Such connection of the nut 330 with the feed screw shaft 700 is simultaneously formed on both sides of the pivoting arm 300, and by the rotation of the feed screw shaft 700, both pivoting arms 300 are widened or narrowed.

Also, the portion of the pivoting arm through which the feed screw shaft 700 passing through the fitting hole 320 and the nut 330 is cut out in a longitudinal direction so as to have the shape of a rectangular hole 321. This is the structure for providing a moving space for the feed screw shaft 700 moving in a front and rear direction when the tightening and loosening operation of the pivoting arm 300 is conducted. Further, for the tightening and loosening operations of the pivoting arm, one side of the helical part 710 formed on both sides of the feed screw shaft 700 shall have the shape of a left-handed screw and the other side thereof shall have the shape of a right-handed screw. Also, the nuts 330 of the pivoting arms 700 engaged with the helical part 710 has a thread structure in each the helical hole 331 according to the screw shape of both helical parts 710.

Also, along the pivoting arm 300 a reinforcing rib 310 (FIG. 3) is extendedly formed in a longitudinal direction, and at the end portion of the pivoting arm 300, a boss 310a is formed and holding means 400 is fixedly inserted into the boss 310a.

Figure 7:
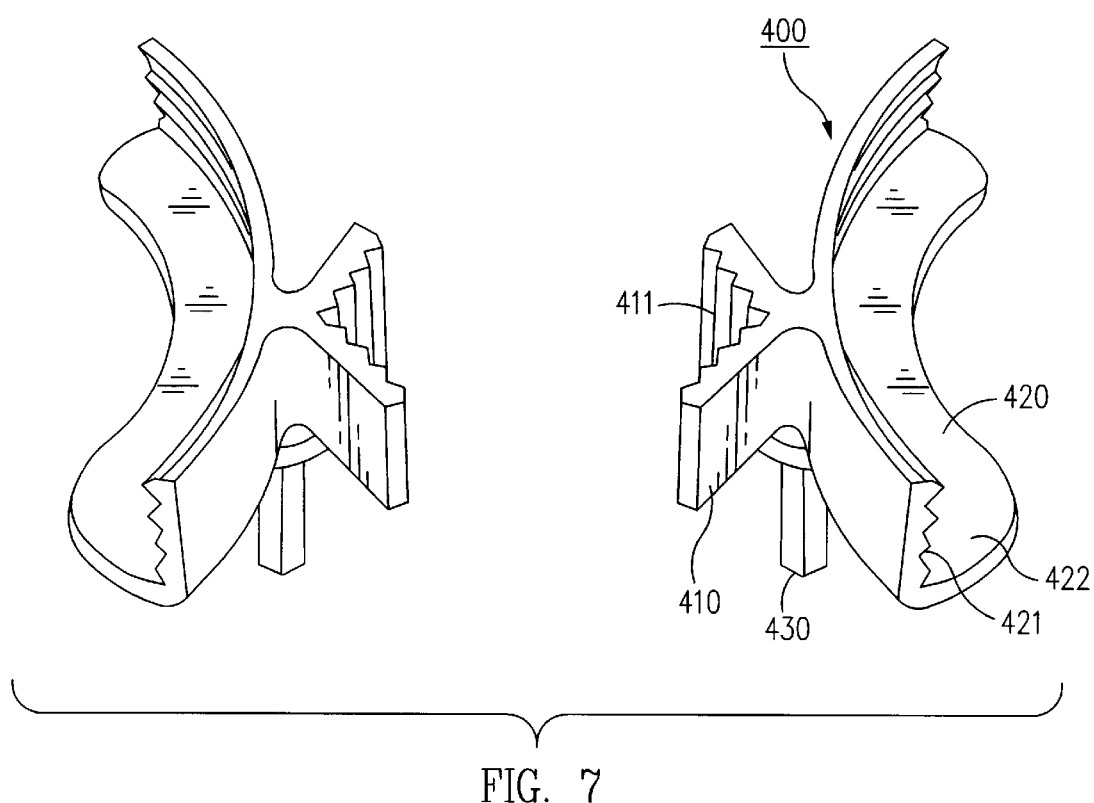
FIG. 7 is a perspective view illustrating holding means for holding a shock absorber according to the present invention.

FIG. 7 illustrates the structure of such holding means. An outer holding means 420 has a curved shape of relatively large radius of curvature facing toward the outside. At the bottom a base plate 422 of the outer holding means 420 is extended at a regular interval in a vertical direction. Further, an inner holding means 410 structurally connected with one side of the outer holding means 420 has a square shape. Also, on the outer and inner holding means 410, 420 tooth forms 411, 421 are formed respectively. The shape of such tooth forms 411, 421 has the structure such that the inner holding means 410 is vertically formed and the outer holding means 420 is horizontally formed. In the structure of a section shown in a vertical direction of the outer holding means 420 the upper portion has a wider section and the lower portion has a narrower section.

The structure of inner and outer holding means 410, 420 described above is for holding the shock absorber more stably. At the lower portion of the holding means 400 having such construction a fixing shaft 430 of a square shape is projected downward and the fixing shaft 430 of the holding means 400 is inserted into a fixing groove 311 (FIG. 3) of the boss 320 formed on the pivoting arm 300. That the fixing shaft 430 and a fixing groove of the boss 311 are constructed in a square shape is to prevent the rotation of the holding means 400.

FIG. 10 illustrates one example of the structure of a stopper 180 holding the spring of the shock absorber. In this structure, the head 170 is rotatively connected to the spring holder 150 with a hinge shaft 160 and a fixed hole 171 is formed on the head 170 so that the outer surface of the hinge shaft 160 can be opened toward the outside. Into such fixed hole a short cylindrical supporting means 181 is inserted and the stopper 180 is inserted to push the supporting means. A spring 182 is mounted between the stopper 180 and supporting means 181 and by means of the resilient force of the spring 182 the supporting means 181 is pushed inside the fixed hole 171 thereby tightly supporting the outer surface of the hinge shaft 160.

Further, for holding the spring of the shock absorber, the supporting position of the spring of the shock absorber is established by moving the spring holder 150 in a vertical direction of the hinge shaft 160. For establishing the position of the spring holder 150 in the beginning, if there is no supporting means, it is not easy to establish the supporting position due to skidding by its own load of the spring holder 150. Consequently, on the outer surface of the hinge shaft 160 a skid-proof groove 161 for the prevention of skidding by using the supporting means 181 is formed in an engraved grid shape. Also, the stopper 180 will establish and restrict the widening degree of the spring holder 150 and has the structure being screwed with the fixed hole 171. In this structure, if the stopper 180 is conveyed in a front and rear direction, the spring 182 positioned between the section of the stopper and the supporting means 181 is compressed, and by means of the resilient force of the compressed spring 182 the degree of close adhesion is adjusted. At the same time, the stopper restricts the widening degree of the spring holder 150, and by adjusting the projecting degree of the stopper 180 exposed toward the outside, the reciprocating degree of the spring holder, that is, the widening degree can be adjusted.

Operation of the spring compression device for a shock absorber according to the present invention having such construction is described hereinafter.

Figure 8A:
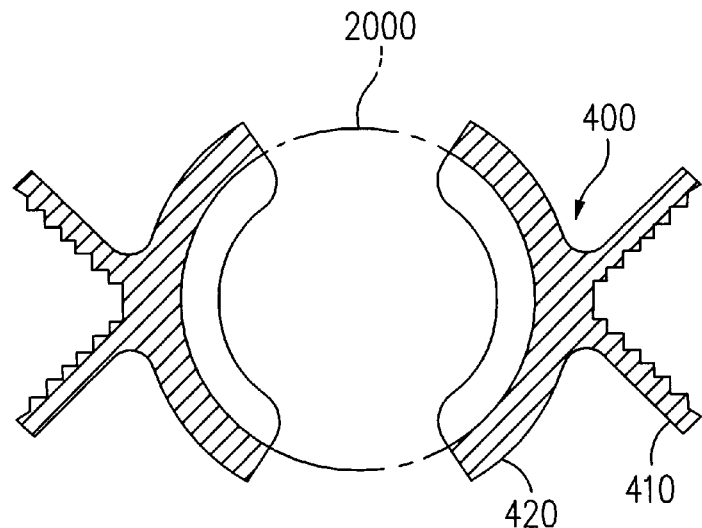
FIG. 8A and FIG. 8B are top views illustrating the holding state of a shock absorber by holding means of a shock absorber according to the present invention.
Figure 8B:
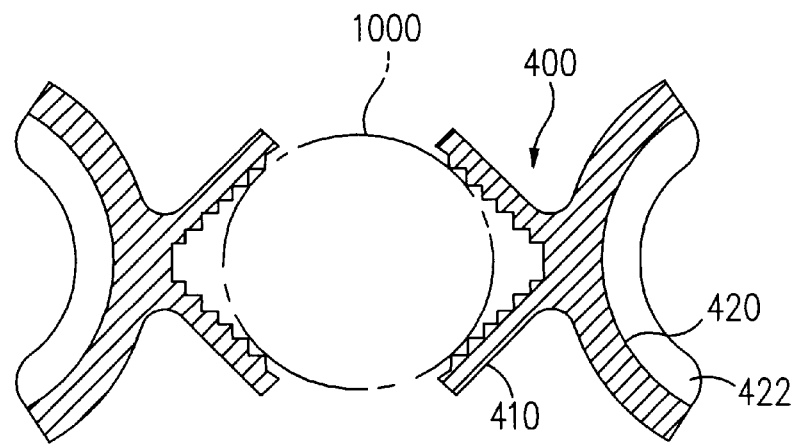

In setting up the shock absorber in the spring compression device according to the present invention, if a shock absorber 1000 of a small diameter or circular shape is mounted in the compression device, it is mounted in the pivoting arm 300 facing each other toward the inner holding means 310 of the holding means 300 mounted at the end portion of the pivoting arm 300 as shown in FIG. 8B, and the shock absorber is positioned between the inner holding means 410 of a square shape facing each other. As such, after the shock absorber is positioned between the inner holding means 410, by turning the pivoting arm tightening handle 800 (FIG. 3) of the helical part formed on both sides of the feed screw shaft 700, the pivoting arms 300 in which the inner holding means 410 are mounted are moved inwardly thereby the inner holding means 410 fixes the periphery of the shock absorber 1000 with uniform pressure.

Figure 9:
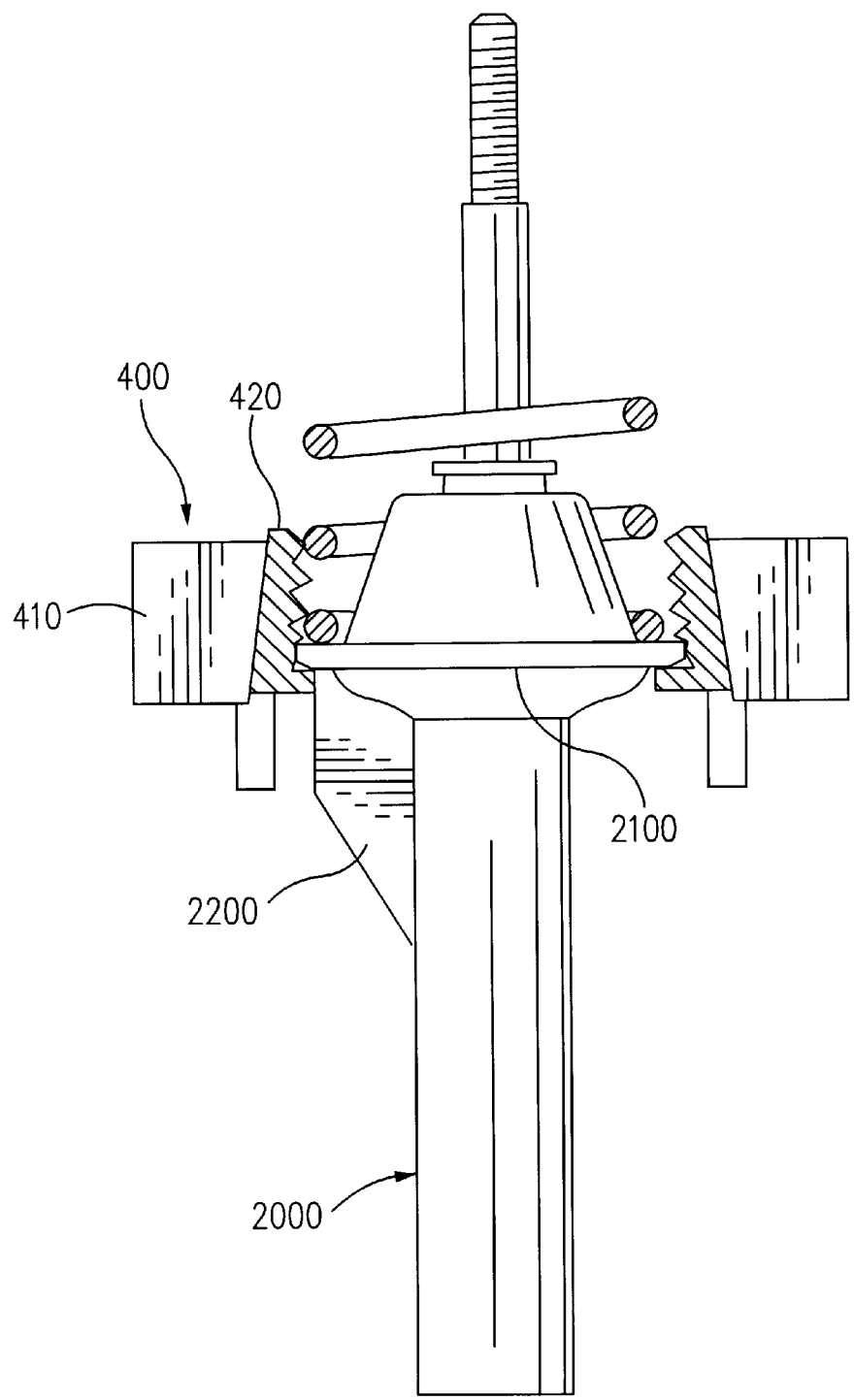
FIG. 9 is a front view illustrating the state of a shock absorber mounted in an outer holding means according to the present invention.

On the other hand, if a shock absorber 2000 having a large diameter and big shape or a reinforcing rib 2200 is mounted in the spring compression device, the holding means 400 is mounted in an opposite direction to the set-up position of the holding means 400 mounted in the pivoting arm 300 as shown in FIG. 8A, facing each other toward the outer holding means 420. As such, the shock absorber 2000 is fixedly positioned between the outer holding means 420 facing each other. In this case, a flange 2100 (FIG. 9) of the shock absorber 2000 is placed on the base plate 422 of the outer holding means 420 and has the structure where the fixing operation is done by means of the tightening operation of the pivoting arm tightening handle 800.

Accordingly, as can be seen from the structure and operation described above, the present invention has the construction that a fixing range of the shock absorber can be enlarged by alternatively varying the shape of the holding means 400 supporting the shock absorber according to the diameter and specification of the shock absorber.

That is, if the shock absorber 2000 having a large diameter or the reinforcing rib is fixed to a device, the outer holding means 420 fixes the flange 2100 of the shock absorber 2000 as shown in FIG. 8A. Accordingly, structural interruption from the reinforcing rib 2200 of the shock absorber can be avoided and the present invention provides operation environments enabling to perform wider ranges of the spring set-up for the shock absorber.

Also, for the normal fixation of the shock absorber 1000 to the device, it has the operation structure which the shock absorber 1000 can be fixed by changing the fixing direction into the inner holding means 410.

As can be seen from the forgoing descriptions, the present invention is a useful device enabling one to perform the wider ranges of the spring set-up for the shock absorber by varying the size and shape of the pivoting arm in correlation with the specification of the shock absorber which varies according to the kind of a vehicle.

In the meantime, it is obviously understood by the person skilled in the art that the present invention is not limited to the particular embodiment disclosed herein as the best mode contemplated for carrying out the present invention, and that various alteration or modification thereof can be made within the present invention.

What is claimed is:

1. A spring compression device for a shock absorber of a motor car comprising:

a hollow post being vertically formed;

a rack being mounted inside the hollow post, being engaged with a pinion and being movable upward or downward;

a compression handle for moving the rack upward or downward;

a spring holder having a spring hanger for hanging a spring of the shock absorber, one end of the holder connected by a hinge to a head formed at the top of the rack so as to be rotated left and right;

a second hinge formed in an integral structure at a lower part of the hollow post;

a pair of pivoting arms each having a boss, the pivoting arms rotatively mounted on both sides of the second hinge so as to be widened left and right, a shock absorber holder inserted in each boss;

a feed screw shaft moving the pivoting arms left and right centering around the second hinge;

a pivoting arms tightening handle being formed at one end of the feed screw shaft and performing loosening and tightening operations; and wherein the absorber holder includes an outer holding portion detachably engaged with the boss, one end of the absorber holder holding a shock absorber of a large diameter, and an inner holding portion alternatively holding a shock absorber of a small diameter.

2. A spring compression device for a shock absorber of a motor car as set forth in claim 1, wherein the feed screw shaft passes through a circular fitting hole in one surface of the pivoting arms, the fitting hole including a short cylindrical nut having a helical threaded hole, the feed screw shaft including a helical part screwed into the helical threaded hole of the nut.

3. A spring compression device for a shock absorber of a motor car as set forth in claim 2, wherein said helical part is formed on both ends of the feed screw shaft and wherein one end comprises a left-handed screw and an opposite end comprises a right-handed screw and at either end the pivoting arms tightening handle is formed.

4. A spring compression device for a shock absorber of a motor car as set forth in claim 1, wherein said feed screw shaft comprises in the center a groove formed in a longitudinal direction, a guide projection including a cut-out opening extending from one side of the hollow post so as to allow reciprocaton of the feed screw shaft in a front and rear direction.

5. A spring compression device for a shock absorber of a motor car as set forth in claim 1, wherein said outer holding portion of the absorber holder has a curved shape having a large diameter, and said inner holding portion of the absorber holder has a square shape.

6. A spring compression device for a shock absorber of a motor car as set forth in claim 1, wherein the inner holding portion of the absorber holder includes a tooth form mounted in a vertical direction and the outer holding portion includes a tooth form mounted in a horizontal direction.

7. A spring compression device for a shock absorber of a motor car as set forth in claim 1, wherein a vertical part of the outer holding portion is wider at the top and becomes narrower in width downward.

8. A spring compression device for a shock absorber of a motor car as set forth in claim 1, further including a stopper screwed between a hinge shaft rotatively connecting the spring holder to the head so as to prevent skidding of the spring holder in a vertical direction and to restrict the rotation of the hinge shaft.

* * * * *